Jan. 30, 1962  J. R. BRUCKER  3,018,792
DUAL ORIFICE VALVE
Filed Feb. 16, 1959
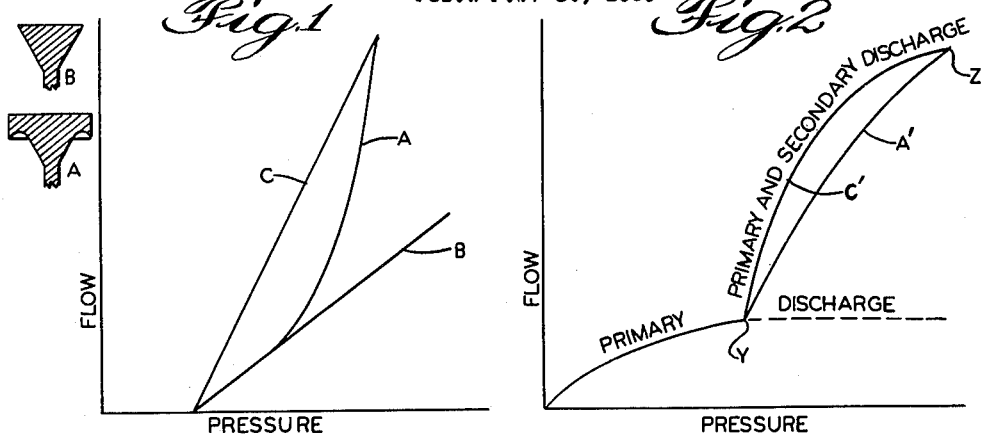
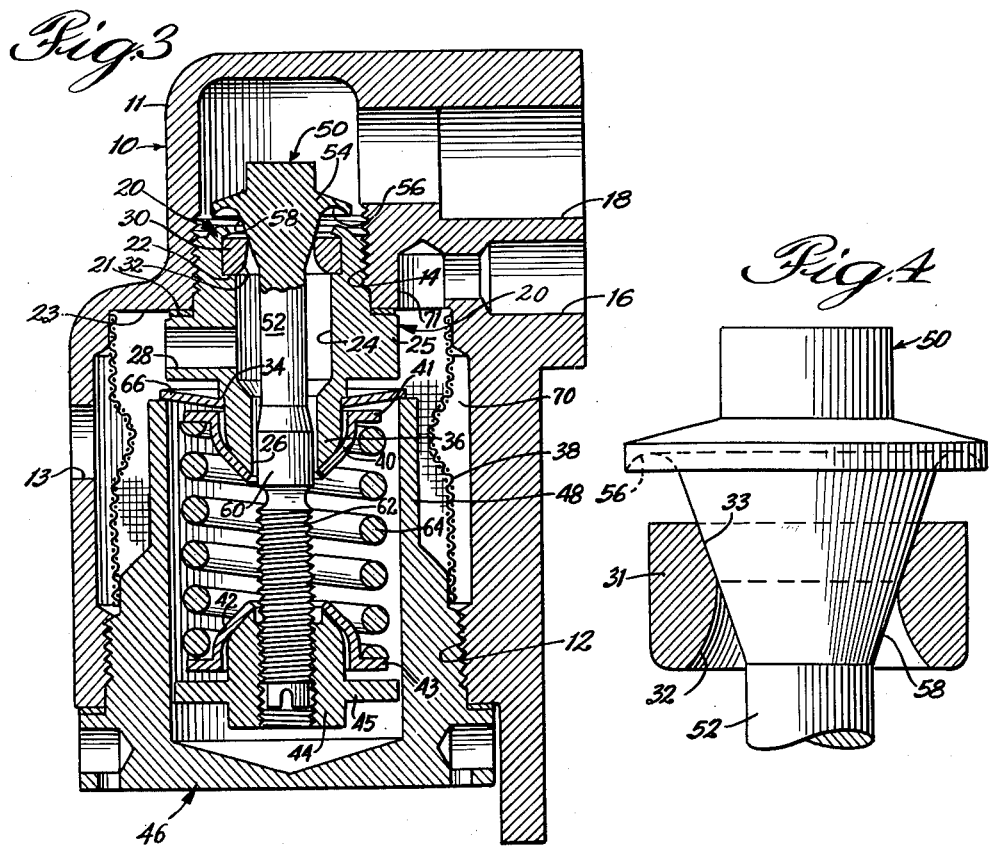
INVENTOR:
James R. Brucker,
BY Bair, Freeman & Molinare
ATTORNEYS.

3,018,792
DUAL ORIFICE VALVE
James R. Brucker, West Des Moines, Iowa, assignor to Delavan Manufacturing Company, West Des Moines, Iowa, a corporation of Iowa
Filed Feb. 16, 1959, Ser. No. 793,434
3 Claims. (Cl. 137—469)

This invention relates to relief valves and more particularly to a flow regulating valve having two discharge ports, one of which is open at all times when the valve is in operation and the other of which opens when the pressure in the valve builds up to a predetermined point. Valves of this kind are commonly used in supplying dual orifice nozzles for atomizing liquid fuels and the like. The valve of the present invention is particularly adapted for use in conjunction with a dual orifice nozzle of the type shown in Patent No. 2,703,260.

One of the difficulties with flow regulating valves of this kind is that they require considerable pressure drop for producing the maximum desired flow through the valve. Consequently, less energy is available for atomizing the liquid through the secondary orifice of the nozzle supplied by the flow from the secondary port of the valve.

It is, therefore, the primary object of the present invention to provide a valve of this type which produces a maximum volume of liquid flow through the secondary port for a minimum increase in pressure so that more energy is available for discharging and atomizing the liquid from the secondary orifice of the nozzle. The following detailed explanation of the invention and its novel valve construction will clarify the problem which the present invention is intended to solve.

In the drawing:

FIGURE 1 is a flow-pressure graph showing the flow curves for valves having the plug construction of the invention compared with those of the prior art;

FIGURE 2 is a similar graph which shows the total flow from a dual orifice nozzle supplied by flow divider valves having the plug constructions exhibiting the characteristics shown in the curves of FIGURE 1;

FIGURE 3 is a sectional view through a dual orifice flow regulating valve constructed in accordance with the invention; and FIGURE 4 is a fragmentary sectional view of the valve plug of the invention and a complementary seat of modified construction.

Referring to FIGURE 1, it will be noted that an ordinary conical plug type valve such as that used in prior art valves produces a flow which is directly proportional to the pressure of the fluid. This curve is indicated by the letter B. Curve A on the same graph shows the flow characteristics of a valve constructed in accordance with the invention. Curve C shows the flow characteristics for an ordinary conical plug type valve with larger dimensions which are required to produce the same maximum flow as curve A. Curve A reveals in a striking manner the minimum change in flow rate for a change in pressure immediately after the valve has opened and the minimum pressure rise required to produce the desired maximum flow.

If a valve having the characteristics exemplified by the curves of FIGURE 1 is attached to a dual orifice nozzle such as that shown in Patent 2,703,260, the total flow from the nozzle will correspond to the curves shown in FIGURE 2. As the fluid pressure is increased the flow will be through the primary discharge orifice of the nozzle until point Y is reached, whereupon the pressure becomes sufficient to open the secondary discharge port of the valve to supply fluid to the secondary orifice of the nozzle. The devices having the curves shown in FIGURE 2 are all designed to produce the same flow volume at a predetermined maximum pressure which is indicated at point Z. As the pressure is increased beyond point Y, the flow from the nozzle is greatly increased for a small increase in pressure when the plug type prior art valve is used (curve C.). This is due to the fact that the plug type valve dimensions must be considerably larger to produce the desired maximum flow rate. C' is the flow of the curve C of FIGURE 1 superimposed upon the primary discharge curve shown in FIGURE 2 in broken lines.

Curve A' of FIGURE 2 illustrates the flow from a dual orifice nozzle supplied by a valve constructed in accordance with the invention. Here the curve A of FIGURE 1 is superimposed on the primary discharge curve and the result is a curve which approaches a straight line.

The flow characteristics of curve A are achieved by constructing the valve plug in the secondary discharge port of the dual orifice valve so as to utilize impact of the flowing liquid to assist the pressure head in opening the valve. The detailed construction of the plug will be disclosed below.

Referring to FIGURE 3, the valve body 10 consists of a casting which has one open end internally threaded as indicated at 12. The head 11 of the valve body opposite the open end is somewhat smaller in diameter than the body proper and has a couple of radial discharge passages 16 and 18 to which conduits may be connected for supplying fluid from the valve to the primary and secondary orifices, respectively, of the nozzle. The head portion 11 of the valve body is internally threaded at 14 to receive an insert 20. Insert 20 has a central bore 24 which is of slightly lesser diameter toward the lower end, as indicated at 26. A counterbore 22 at the upper end of bore 24 forms a shoulder for receiving the valve seat insert 30. The valve seat insert constitutes a ring having an inner curved surface 32 flared toward the bottom, for directing fluid flow through the ring. The flare of said inner curved surface 32 is in a direction away from the head to provide an annular space of progressively increasing width from the line or surface of contact between said plug and said seat. A radial bore 28 through the body of insert 20 connects with the internal bore 24 to supply fluid to the secondary discharge port 18. The insert 20 has a flange 25 which seats on the face 23 of the body against a gasket 21 which seals the insert 20 with the body so that no fluid can pass into the secondary discharge port 18 except through the bore 24 past valve member 50.

The valve member 50 having a stem 52 terminates at its upper end in a head 54 and at its lower end in a threaded portion 62. The head 54 is adapted to seat against the insert ring 30 to close off port 18. The stem 52 is slightly larger in diameter at the intermediate portion 60 which portion is adapted to slide within the bearing opening 26 in the lower end of the insert 20 to facilitate movement of the valve member within the valve body.

To bias the valve head 54 toward the seat 30, I have provided a spring 64 which bears against flanges 41 and 43 of the retainer rings 40 and 42. Retainer rings 40 and 42 are narrowed at the top and are adapted to bear against the spherical end surfaces 36 of the insert 20 and the end of the sleeve 44 which screws onto the threads 62 on the end of the stem 52. The sleeve 44 has a flange 45 and may be screwed up or down the valve stem to increase or decrease the compressive force of the spring 64. Thus, the pressure required to open the valve may be adjusted.

The lower end of the valve body 10 is closed by means of a plug 46 having a sleeve or depending skirt 48 which encircles the spring 64 and abuts against a washer 66 seated on the shoulder 34 cut in the surface of insert 20. The plug 46 is externally threaded so that it screws into the threads 12 provided on the inside diameter of the valve body. If desired, a cylindrical filtering member 38 or the like may be provided to remove foreign materials from the liquid to prevent plugging of the valve.

A liquid inlet 13 is located in the side of the valve body so that fluid may flow through that opening into the annular space 70 which connects through the channel 71 to the primary discharge port 16. Simultaneously, fluid enters the opening 28 and bears against the underside of the valve plug. The plug, of course, does not open until the pressure within the valve has built up to the predetermined value required to open the valve against the force of the spring 64.

An important feature of the present invention is the configuration of the head or plug 54 integrally formed on the end of the stem 52. The stem 52 fans out conically, as indicated at surface 58, and this frusto-conical surface joins tangentially with the curved groove 56 in the underside of the impactor head 54. The head then resembles a mushroom with a smoothly curved underside. Attention is called to the fact that the surface 58 seats against the inside diameter of the insert ring 30 near the top edge.

As the pressure of the liquid within the bore 24 begins to build up, the force exerted on the surface 58 of the head initiates lifting of the head to provide an annular space between the surface 58 and the surface 32 of the ring 30. Liquid flows through this annular space over the surface 58 and against the grooved underside 56 of the head. The pressure of the liquid continues to lift the head until the force exerted against the head is counteracted by the force of the spring 64. As the pressure increases the valve member lifts and the annular space increases. This provides constantly increasing flow and velocity against impactor head 54 resulting in maximum fuel flow with minimum pressure drop. The liquid passing through the valve is discharged into the secondary port 18 which may connect to the secondary orifice of a nozzle. Of course, liquid continues to flow through the primary port simultaneously with flow through the secondary port and is discharged through the primary orifice of the nozzle. The result is a flow curve of the type illustrated as curve A' in FIGURE 2.

In FIGURE 4 I have shown an alternative form of my invention wherein the valve seat 30 is replaced with a similar seat 31 having a different internal configuration at the top. It will be noted that in this form of the invention the inside diameter of the insert ring increases from the center toward the top to form a flaring surface 33 which complements the surface 58 of the valve head. Thus, instead of having line contact between the surface 58 and the inside diameter of the ring, I have surface contact over the entire area where the lower portion of the head and the surface 33 of the ring coincide.

It will be apparent that although this invention has been described in connection with a dual port valve, the advantages provided by the novel head construction are also important and may be utilized in an ordinary relief valve. In a relief valve, of course, there is usually just one inlet and one outlet port with the valve seat extending therebetween, which seat is closed by the spring-biased valve member having a head, which in this case would be constructed in accordance with the teaching of the present invention. Other modifications of the invention will occur to those who are skilled in the art. It is my intention to cover by the appended claims those constructions which are equivalent to or which can be considered modifications of the basic concept taught in this specification.

What I claim as new and desire to secure by Letters Patent of the United States is:

1. In a flow divider valve for supplying fluid to a dual orifice nozzle, said valve comprising a body having an inlet port, a primary outlet port and a secondary outlet port adapted to supplement fluid flow through said primary port upon attainment of a predetermined pressure drop across said valve, the improvement comprising in combination a ring-like valve seat disposed within said secondary outlet, a stem mounted for axial movement within said body and terminating at its outer end in a frusto-conical plug which begins to flare from the stem and terminates in an impactor head on the downstream side of said seat, a curved groove in the underside of said head tangentially joined with the frusto-conical surface of said plug to form a smooth fluid-diverting surface from the stem to the periphery of said head, said valve seat flaring outwardly in a direction away from said head to provide an annular space of progressively increasing width upstream from the line of contact between said plug and said seat, and spring means for biasing said plug toward said seat.

2. The valve of claim 1 wherein the downstream face of said valve seat is frusto-conical in configuration to complement the flare of said plug and provide a circumferential area of contact between said plug and said seat.

3. A fluid metering valve having a body with an inlet and outlet port, an opening within said body connecting said inlet and outlet ports having a marginal ring-like valve seat, an outwardly-flaring frusto-conical plug mounted for movement into and out of sealing contact with said seat and terminating at one end in a head on the downstream side of said seat and at the other end in a stem for actuating said head, the inner surface of said valve seat flaring outwardly in a direction away from said head to provide an annular space of progressively increasing width upstream from the line of contact between said plug and said seat, a spring for biasing said head toward said seat, and a curved groove in the underside of said head joining with the flared surface of said plug to form a smooth fluid diverting surface down to the stem whereby said plug is lifted from said seat under the force of said fluid pressure.

References Cited in the file of this patent

UNITED STATES PATENTS

| | | |
|---|---|---|
| 58,294 | Richardson | Sept. 25, 1866 |
| 217,745 | Pringle | July 22, 1879 |
| 306,208 | Ashton | Oct. 7, 1884 |
| 325,273 | Richardson | Sept. 1, 1885 |
| 1,124,203 | Bingley | Jan. 5, 1915 |
| 1,360,160 | Weaver | Nov. 23, 1920 |
| 1,630,362 | Sutton | May 31, 1927 |
| 2,226,732 | McBride | Dec. 31, 1940 |
| 2,297,535 | Bryant | Sept. 29, 1942 |
| 2,593,884 | Ifield | Apr. 22, 1952 |
| 2,622,613 | McNeal | Dec. 23, 1952 |
| 2,674,260 | Thrush | Apr. 6, 1954 |
| 2,875,978 | Kmiecik | Mar. 3, 1959 |